US005388720A

United States Patent [19]

Murphy

[11] Patent Number: 5,388,720

[45] Date of Patent: Feb. 14, 1995

[54] FLANGED DIFFUSER AND AIR CELL RETAINER FOR PRESSURE VESSEL

[75] Inventor: James C. Murphy, Chardon, Ohio

[73] Assignee: Essef Corporation, Chardon, Ohio

[21] Appl. No.: 228,192

[22] Filed: Apr. 15, 1994

[51] Int. Cl.[6] .................. F16L 55/00

[52] U.S. Cl. .................. 220/581; 138/30

[58] Field of Search .................. 220/581, 582, 402, 408, 220/426, 468, 469; 138/30

[56] References Cited

U.S. PATENT DOCUMENTS

| | | | |
|---|---|---|---|
| 3,182,685 | 5/1965 | Mercier | 138/30 |
| 4,112,978 | 9/1978 | Olbrich et al. | 138/30 |
| 4,166,478 | 9/1979 | Sugimura et al. | 138/30 |
| 4,214,611 | 7/1980 | Takacs et al. | 138/30 |
| 4,301,827 | 11/1981 | Murthy et al. | 138/30 X |
| 4,408,635 | 10/1983 | Packer | 138/30 |
| 4,751,938 | 6/1988 | Kerns et al. | 220/207 X |
| 4,785,956 | 11/1988 | Kepler et al. | 220/3 |

*Primary Examiner*—Steven M. Pollard

*Attorney, Agent, or Firm*—Pearne, Gordon, McCoy & Granger

[57] ABSTRACT

A diffuser is attached to a flexible inner cell inside an outer vessel. The outer vessel contains a first fluid and the inner cell contains a second fluid. The diffuser has a flange which is sandwiched between a flanged port and a flanged neck of the outer vessel. The diffuser is contained substantially within the neck of the outer vessel. A generally circular surface of the diffuser deflects fluid entering the outer vessel through the port. A side wall of the diffuser is provide with apertures to permit passage of the fluid therethrough.

10 Claims, 2 Drawing Sheets

Fig.3
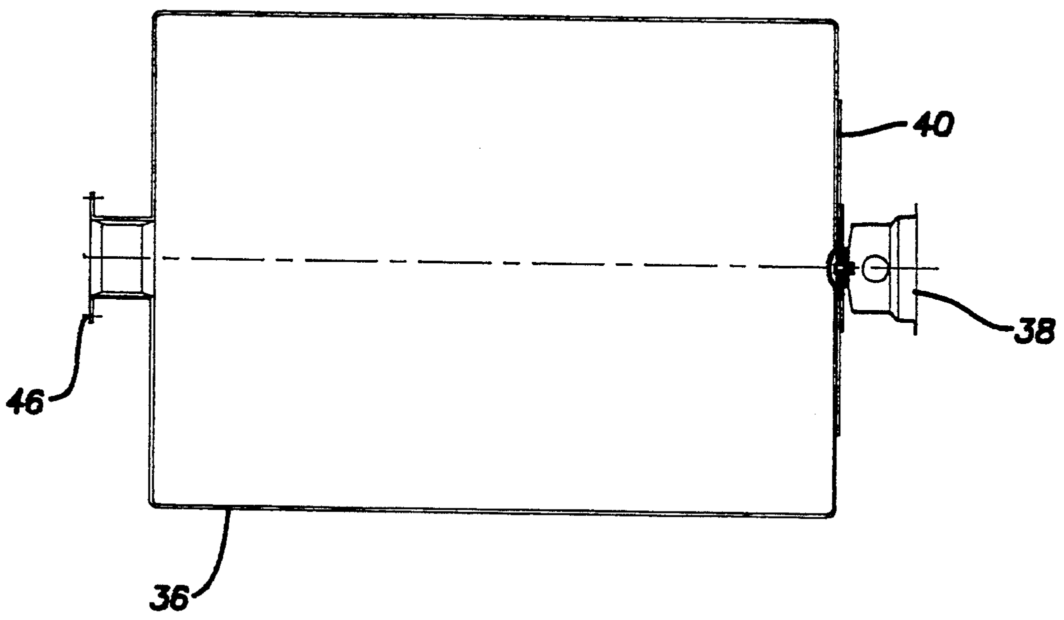
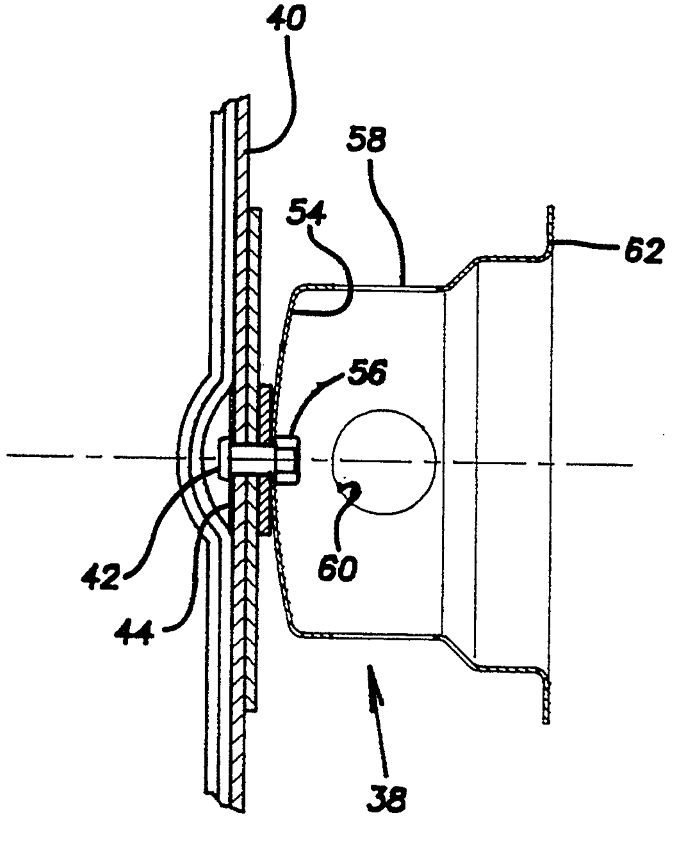
Fig.3A

FLANGED DIFFUSER AND AIR CELL RETAINER FOR PRESSURE VESSEL

BACKGROUND OF THE INVENTION

1. Field of the Invention

This invention relates generally to the field of pressure vessels and specifically to a diffuser and air cell retainer therefor.

2. Description of the Related Art

Liquid dispensing systems often use pressure vessels, such as accumulators or pressure control devices for holding a liquid. Commonly, a pipe extends into a water source, such as a well. A pump forces water from the well, through the pipe, and into the pressure vessel. Water is then distributed from the pressure vessel, as needed, to a household water system, for example. One type of pressure vessel is shown in U.S. Pat. No. 4,785,956 to Kepler et al., which is incorporated herein by reference.

The pressure vessel, or tank, includes an inflatable air cell, such as a bag, therein with an inflating valve extending through one end of the vessel. An inlet and outlet port in fluid communication with the water system is provided at the other end of the vessel. As water is pumped into the vessel, the bag is forced upwardly by the incoming water. The upward movement of the bag tends to form a crease thereby causing excessive wear and premature failure of the bag.

U.S. Pat. No. 4,214,611 to Takacs, incorporated herein by reference, shows a tie-down system for the bag. The tie-down holds the center bottom part of the bag in place to more evenly distribute the flexing force on the bag. Such a tie-down has been effective in prolonging bag life, but has proven somewhat difficult to assemble and disassemble. In addition, the tie-down can only be used in tanks having a threaded port. The tie-down also projects into the tank.

Typically, the bags are removed and replaced during the life of the pressure vessel. Thus, it would be desirable to have a tie-down which is easy to assemble. The tie-down should also serve to diffuse water at the point of entry into the vessel to protect the bag from the force of direct flow. The tie-down should also use a minimum amount of space and should be useful in tanks having a neck and a flange at the inlet and outlet port.

SUMMARY OF THE INVENTION

The present invention provides a pressure vessel. The pressure vessel includes an outer vessel for containing a first fluid and a flexible inner cell for containing a second fluid. The inner cell is disposed within the outer vessel so as to separate the first fluid from the second. A first port communicates with the inner cell and a second port communicates with the outer vessel. A neck is disposed on an end of the vessel around the second port. A diffuser has a deflecting surface for deflecting the first fluid away from the inner cell when the first fluid is flowing through the second port into the outer vessel. The diffuser is disposed substantially within the neck. Preferably, the deflecting surface is generally planar.

The pressure vessel also includes at least one side wall connected to the deflecting surface. The side wall includes at least one passage for permitting fluid to flow therethrough from the second port into the outer vessel. The deflecting surface is generally circular. The diffuser also includes a generally cylindrical surface connected at edges of the circular surface and normal to the circular surface. The generally cylindrical surface has at least one passage for permitting fluid to flow therethrough from the second port into the outer vessel. A diffuser flange around an edge of the cylindrical surface is secured to a flange of the neck of the outer vessel. A fitting on the second port has a flange, and the diffuser flange is sandwiched between the flange of the neck and the flange of the fitting. A gasket is sandwiched between the flange of the neck and the flange of the fitting in a sealing relationship.

The diffuser is attached to the inner cell by a nut and bolt assembly through a central hole of the deflecting surface and a hole in the inner cell.

As described, the present invention is more easily installed and removed than prior art apparatus and provides a low profile installation.

BRIEF DESCRIPTION OF THE DRAWINGS

FIG. 3 shows a side view of a bag removed from the pressure vessel; and

FIG. 3A is an enlarged detailed view of the means for attaching a diffuser to a bag illustrated in FIG. 3.

DESCRIPTION OF THE PREFERRED EMBODIMENTS

Figure 1:
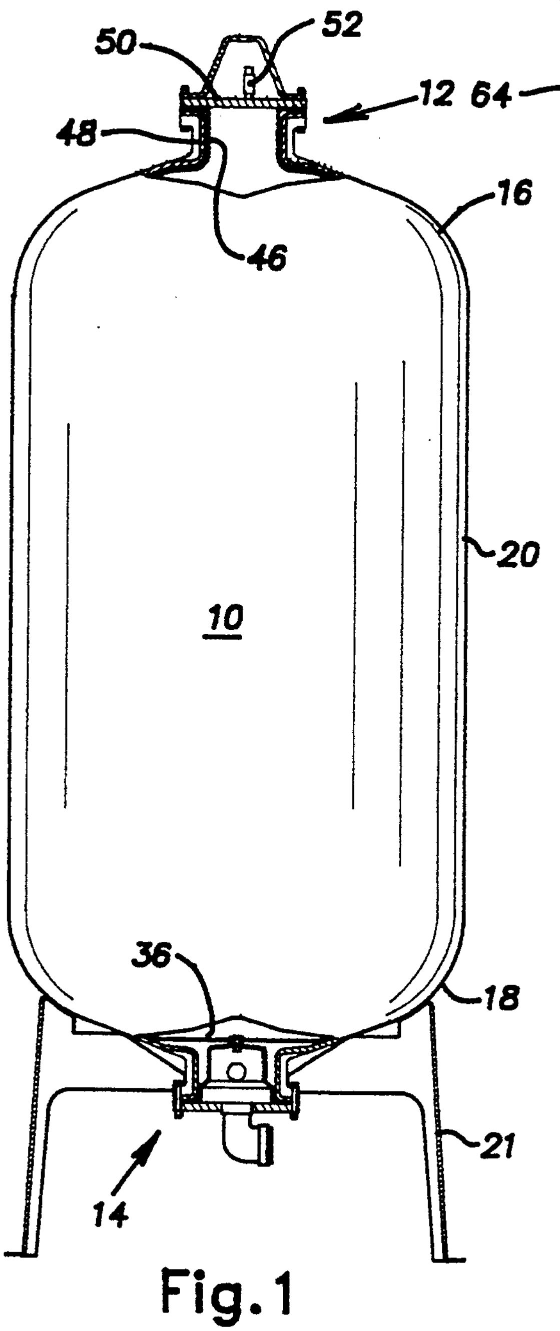
FIG. 1 shows a side elevational view partially cut away of a pressure vessel according to the invention.

Referring to FIG. 1, an outer pressure vessel or tank 10 has a top port 12 or opening and a bottom port 14 or opening. The vessel 10 is preferably formed of top and bottom domed end portions 16 and 18, each having the geometric configuration of an oblate ellipsoid, and an intermediate, cylindrical portion 20. While the pressure vessel 10 may be built from separate portions cemented together to form a unitary tank, it is more desirable to produce a unitary, seamless tank by blow molding or rotationally casting a liner 23 and then winding the liner with filaments 25. The tank may also be molded from glass fiber-reinforced resinous compositions. The tank is preferably supported on a foot structure 21.

Figure 2:
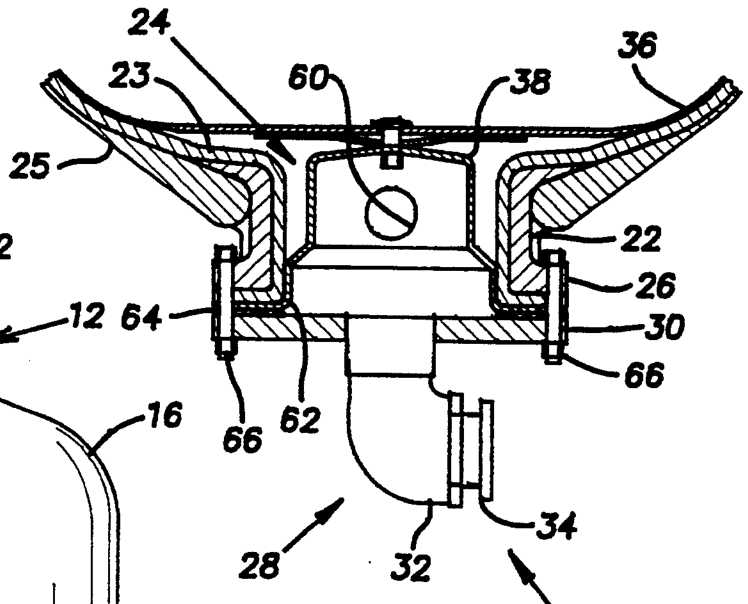
FIG. 2 shows a detailed sectional view of a diffuser installed in the pressure vessel.

As shown in FIG. 2, a neck 22 extends from the bottom end 18 to define a generally cylindrical passage 24 in communication with the inside of the vessel 10. The neck 22 has an annular flange 26 having a plurality of holes therethrough.

The bottom port 14 includes a pipe fitting 28 having a generally circular flange cover 30. The size of the flange cover 30 corresponds with the size of the neck flange 26, and holes through the flange cover 30 correspond to the holes through the flange 26. The pipe fitting 28 preferably includes an elbow pipe 32 having a connection 34, such as threads, for connecting to a water distribution system.

The interior of the vessel 10 is lined with a flexible, inflatable, gas-tight inner cell, such as a bag 36, shown in FIG. 3. The bag 36 is attached to a diffuser 38 at one end. A disk-shaped membrane 40 is heat-sealed to the bottom of the bag 36. As shown in FIG. 3A, the membrane 40 may be of the same material as the bag 36. A bolt 42 extends through a hole in the membrane 40 and a washer 44 reinforces the membrane.

A top flange 46 is attached to the other end of the bag 36. The top flange 46 is secured in the top port 12 of the tank 10 between a top neck 48 and a top flange cover 50. The top port 12 includes a port passage 52, such as an air valve, in communication with the bag 36 extends in through the top flange cover 50.

Referring to FIG. 3A the diffuser 38 has a circular and generally flat or slightly curved deflecting surface 54. The bolt 42 extends through a hole at the center of the deflecting surface 54 and is secured by a nut 56. A generally cylindrical side wall 58 having one or more passages 60 therethrough is attached around an edge of the deflecting surface. The side wall may be tapered or stepped as required or desired. An annular flange 62 extends around an edge of the side wall 58. The diffuser 38 is preferably made of spun aluminum, but may also by made by hydro-forming or stamping. The diffuser should be resistant to corrosion.

Referring to FIG. 2, the diffuser 38 is installed in the cylindrical passage 24 of the neck 22. The diffuser flange 62 and a gasket 64 are sandwiched between the flange cover 30 and the bottom neck flange 26. Nut and bolt assemblies 66 hold the cover 30 on the flange 26 to firmly hold the diffuser in place and to create a fluid-tight seal.

Water flows into the vessel 10 through the pipe fitting 28. The water is deflected by the deflecting surface 54 and flows through the passages 60. The bag 36, held at its ends by top flange 46 and diffuser 38, is forced radially inwardly, and air is expelled through the top port passage 52. The vessel can be pressurized by pumping air into the bag 36, so that the air tends to force the water out of the vessel, through the passages 60 the diffuser 38, and the pipe fitting 28, to the water dispensing system.

The bag 36 and/or the diffuser can be easily removed and replaced by simply removing the nut and bolt assemblies. The diffuser fits in an existing space in a tank having a neck and flange mount for the pipe fitting.

The present disclosure describes several embodiments of the invention, however, the invention is not limited to these embodiments. Other variations are contemplated to be within the spirit and scope of the invention and appended claims.

What is claimed is:

1. A pressure vessel, comprising an outer vessel for containing a first fluid; a flexible inner cell for containing a second fluid and disposed within the outer vessel so as to separate the first fluid from the second; a first port communicating with the inner cell; a second port communicating with the outer vessel; a neck on an end of the vessel surrounding the second port; said neck having an axis and a cylindrical inner surface defining said port; and a diffuser immovably fixed along the neck axis having a deflecting surface for deflecting the first fluid away from the inner cell when the first fluid is flowing through the second port into the outer vessel, said diffuser having a side wall spaced from and facing said cylindrical inner surface of said neck to define an annular passage communicating with said outer vessel, said side wall including at least one passage surrounded by said cylindrical inner surface of said neck for permitting fluid to flow therethrough.

2. A pressure vessel according to claim 1, wherein the deflecting surface is generally planar.

3. A pressure vessel according to claim 1, wherein the deflecting surface is generally circular and the diffuser further comprises a generally cylindrical surface connected at edges of the circular surface and normal to the circular surface.

4. A pressure vessel according to claim 3, further comprising a diffuser flange around an edge of the cylindrical surface, said flange being secured to a flange of the neck of the outer vessel.

5. A pressure vessel according to claim 4, further comprising a fitting on the second port, said fitting having a flange wherein the diffuser flange is sandwiched between the flange of the neck and the flange of the fitting.

6. A pressure vessel according to claim 1, further comprising a fitting on the second port and a flange around an edge of the diffuser, said flange being sandwiched between a flange of the neck of the outer vessel and a flange of the fitting.

7. A pressure vessel according to claim 6, further comprising a gasket sandwiched between the flange of the neck and the flange of the fitting in a sealing relationship.

8. A pressure vessel according to claim 1, wherein the diffuser is attached to the inner cell.

9. A pressure vessel according to claim 8, wherein the diffuser is attached by a nut and bolt assembly through a central hole of the deflecting surface and a hole in the inner cell.

10. In a pressure vessel comprising an outer vessel for containing a first fluid; a flexible inner cell for containing a second fluid and disposed within the outer vessel so as to separate the first fluid from the second; a first port communicating with the inner cell; and a second port communicating with the outer vessel, said second port having a first axially extending generally cylindrical surface and having a flange for mounting the port to a flange of the outer vessel; a diffuser immovably fixed along the second port axis comprising:

a generally circular deflecting surface for deflecting the first fluid away from the inner cell when the first fluid is flowing through the second port into the outer vessel;

a second generally cylindrical surface integrally connected around an edge of the deflecting surface and normal to the deflecting surface, said second cylindrical surface being concentric with and surrounded by said first cylindrical surface;

at least one passage through said second cylindrical surface surrounded by said cylindrical surface of said second port for permitting fluid to flow therethrough from the second port to an annular space between said first and second cylindrical surfaces; and a flange around an edge of the second cylindrical surface, said flange being sandwiched between the flange of the outer vessel and the flange of the second port.

* * * * *